Figure 1:
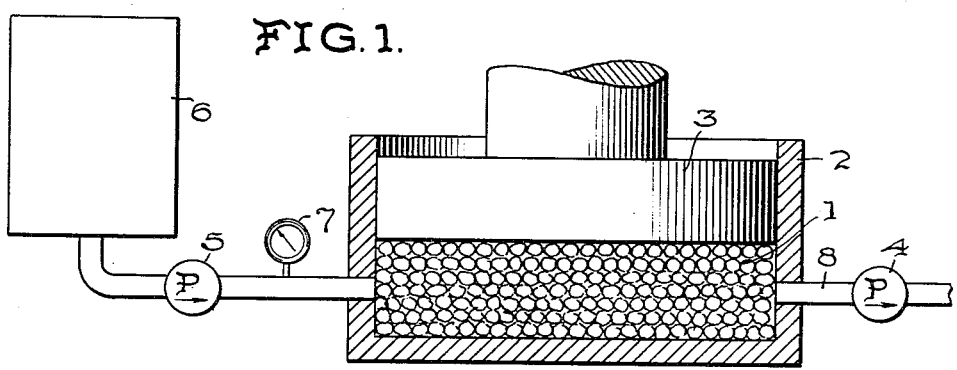

Dec. 18, 1956    M. R. J. WYLLIE    2,774,108
METHOD OF MAKING LOW-RESISTANCE ION-EXCHANGE MEMBRANES
Filed Sept. 16, 1952

INVENTOR.
MALCOLM R. J. WYLLIE
BY
HIS ATTORNEY

United States Patent Office 2,774,108
Patented Dec. 18, 1956

2,774,108

METHOD OF MAKING LOW-RESISTANCE ION-EXCHANGE MEMBRANES

Malcolm R. J. Wyllie, Indiana Township, Allegheny County, Pa., assignor to Gulf Research & Development Company, Pittsburgh, Pa., a corporation of Delaware Application September 16, 1952, Serial No. 309,760

6 Claims. (Cl. 18—47.5)

This invention relates to ion-exchange membranes and a method of making the same, and in particular concerns an improvement in such ion-exchange membranes and method of making them wherein a low value of electrical resistivity is attained.

In copending applications Serial No. 75,924, filed by Patnode and Wyllie on February 11, 1949, entitled Electrode for Determining Cationic Activity (now abandoned); and Serial No. 95,814, filed by Patnode and Wyllie on May 27, 1949, entitled Electrode for Determining Cationic Activity (now abandoned); and Serial No. 252,146, filed by Patnode and Wyllie on October 19, 1951, entitled Electrode for Determining Cationic Activity, now Patent No. 2,614,976, all of which are assigned to the same assignee as the present application, there is disclosed apparatus for making measurements of the cationic activity of electrolytes and particularly an electrolytically-conducting membrane and method of making the same which is useful in an electrode for measuring the ionic activity of electrolytes. The present invention is an improvement over the above-mentioned inventions in that an electrolytically-conducting membrane is provided which has a much lower electrical resistivity, thereby permitting its use for many purposes in which low electrical resistivity is of paramount importance.

This application is a continuation-in-part of my copending application Serial No. 250,322, filed on October 8, 1951, entitled Low-Resistance Ion-Exchange Membranes and Method of Making the Same (now abandoned), which application is assigned to the same assignee as the present application.

In various electrochemical measurements and processes which employ ion-exchange membranes the measurement sensitivity or electrical efficiency of the process is determined by the electrical resistance of the ion-exchange membrane employed. Consequently, it is advantageous to attain as low an electrical resistivity as possible without, of course, sacrificing any degree of electrochemical efficiency. The above-mentioned Patnode and Wyllie applications disclose a membrane which is made by intimately mixing a synthetic ion-exchange material with an electrically-insulating and chemically-inert bonding material, the latter being a well-known plastic, and molding the mixture into the desired shape. Such membranes have been found to have desirable characteristics. Particularly by the use of polystyrene bonding material a high concentration of ion-exchange material, i. e. substantially 75 percent, may be incorporated in the membrane. These membranes have been found to be mechanically more sturdy and to have lower electrical resistivity when compared with prior-art membranes as, for example, the well-known glass electrode.

Investigation of the electrical properties of the aforementioned Patnode and Wyllie membranes has led to the conclusion that conductivity is established through the membrane by way of contact between adjacent particles of ion-exchange material. In the mixing and molding process of the prior Patnode and Wyllie membranes there are undoubtedly produced a large number of ion-exchange particles which are completely surrounded by and sealed into the plastic matrix, and therefore these particles are believed not to contribute to the conductivity of the membrane. On the other hand, certain other particles of ion-exchange material make contact to adjacent particles of ion-exchange material in such manner that through these contacts, conductivity is established from one side of the membrane to the other. The present invention concerns an electrolytically-conducting membrane and method of making the same in which substantially no ion-exchange particle is completely isolated from its neighbor. By thus increasing the number of ion-exchange particles which participate in the conductivity, the process of this invention reduces the electrical resistance of the resulting membrane to a very low value. Furthermore, the process of this invention produces a membrane which is mechanically and in respect of electrochemical efficiency equal to those of the prior art, while the resulting low electrical resistivity of the membrane greatly improves its electrical efficiency making it applicable to very sensitive measurements and to those chemical processes, such as electrodialysis through the membranes, in which electrical power is consumed.

It is accordingly an object of this invention to provide a low-resistivity ion-exchange membrane and method of making the same.

It is a further object of this invention to provide an ion-exchange membrane and method of making the same, which membrane is composed of discrete particles of ion-exchange material which are constrained by and held in contact by an electrically-insulating inert matrix.

It is a still further object of this invention to provide an ion-exchange membrane and method of making the same, which membrane is composed of discrete particles of ion-exchange material substantially all of which take part in a conducting concatenation embedded in an electrically-insulating inert matrix.

Figure 2:
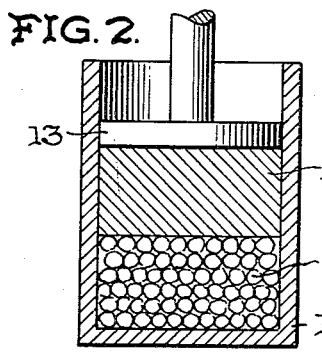
Figure 3:
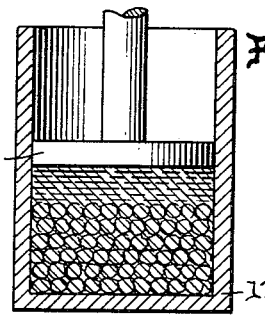
Figure 4:
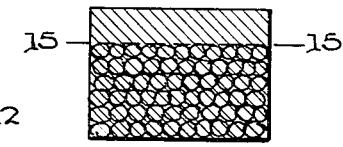
Figure 5:
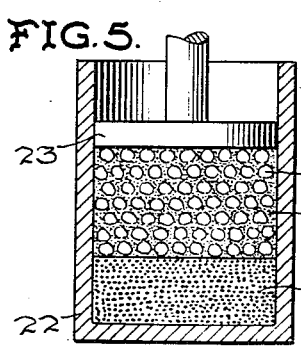
Figure 6:
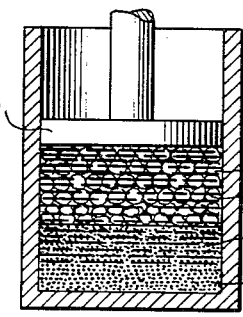
Figure 7:
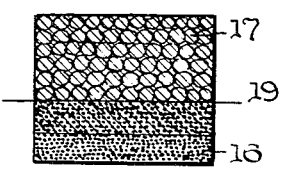
Figure 8:
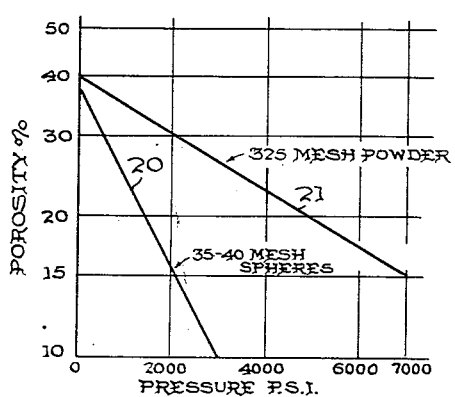

These and other objects are attained by this invention in the manner described in the specification of which the drawing forms a part and in which Fig. 1 illustrates diagrammatically one type of molding press by means of which this invention may be carried out as described;

Figs. 2, 3, and 4 illustrate diagrammatically successive steps of another way in which the process of the invention may be carried out;

Figs. 5, 6, and 7 illustrate diagrammatically successive steps of still another way in which the process of this invention may be carried out; and Fig. 8 is a curve showing the relation between percent interstitial porosity of a particular ion-exchange material when subjected to various molding pressures.

This invention comprises the compacting of a finely-ground ion-exchange material and saturating the voids with a chemically-inert electrically-insulating bonding material without disturbing the intergranular contacts of the ion-exchange particles, whereby there is produced an electrolytically-conducting membrane substantially all of whose active particles take part in the conductivity. In the present invention substantially full concatenation of the ion-exchange particles is achieved.

For making an ion-exchange membrane by the process of this invention, it is preferred to start with finely-ground ion-exchange material. This material may be any known ion-exchange material, either natural or synthetic, either anionic or cationic. Such synthetic materials as well-known sulfonated phenol-formaldehyde or polyamine resins having ion-exchange properties, some commercial forms of which are cationic and some are anionic, are illustrative of synthetic ion-exchange materials which may be used. Certain natural clays, hydrous micas, illites, etc. having ion-exchange properties may be used. It is preferred to use synthetic ion-exchange materials because they produce membranes having high electrochemical efficiency. The ion-exchange material is in particle form, the size of the particles being dependent on the desired characteristics of the membrane to be made and the manner in which the concatenating process is carried out as hereinafter indicated.

The finely-ground ion-exchange material is placed in a press and firmly compacted. The charge in the press may be jarred or vibrated to settle the particles into as small a volume as possible by this means, and then further compacted by the application of pressure through the plunger of the press. It has been found advantageous to apply pressure of the order of 10,000 pounds per square inch in order to effect maximum contact area between neighboring particles of the ion-exchange material. In this manner a maximal concatenation of ion-exchange particles is effected.

The above-described compaction of the material leaves a small volume of voids between particles. The process of this invention fills these voids with a chemically-inert electrically-insulating bonding material without, however, in any way disturbing the contacts between contiguous ion-exchange particles. This may be done by evacuating the compacted and compressed ion-exchange material, and with the compacting pressure still maintained, injecting into the voids a flowable bonding material until the voids are impregnated substantially to saturation. The bonding material is subsequently caused to solidify. The bonding material may, for example, be applied hot and allowed to solidify upon cooling, or it may be one which "sets" by chemical action, e. g. polymerization, oxidation, or in any other manner, such chemical action not chemically involving the ion-exchange material itself. For example, a plastic may be used, either as a polymer rendered liquid by heating, or a liquid monomer containing a catalyst to make the monomer set.

The impregnating step is carried out while the ion-exchange material is under compaction pressure in order that no bonding material will find its way into the contact areas of contiguous ion-exchange particles. To this end also the pressure with which the flowable bonding material is injected into the interstitial voids should be less than the compaction pressure applied to the ion-exchange material during the injection of the flowable binder. In this manner the maximal concatenation of ion-exchange particles is not disturbed. Furthermore, by substantially completely saturating the voids with the bonding material, the ion-exchange particles are very effectively constrained from swelling, and are thereby prevented from imbibing an equilibrium water content. The fact that the ion-exchange particles are unable to imbibe an equilibrium water content appears greatly to improve the electrochemical properties of the membranes.

It is preferred to use polystyrene polymer for the injected plastic binder. However, polystyrene monomer, methyl methacrylate, or other plastics as well as rubber-like polymers may be used for this purpose. It is essential that the molding temperature should not exceed the decomposition temperature of the ion-exchange material, and that the injection pressure shall not exceed the static pressure on the compacted ion-exchange particles.

Referring to Fig. 1, the powdered ion-exchange material 1 may be placed into the receptacle 2 of a press whose plunger 3 is operated in the usual manner to apply pressure to the material 1. The material is compressed so that the voids form as small a fraction of the total volume as possible. Satisfactory membranes can be made with the porosity of the material (prior to injection of the plastic) ranging from 50 percent to 20 percent depending on the size of the ion-exchange particles used. It is preferred to use ion-exchange material which has been ground to pass 200 mesh U. S. Standard Screen Series.

Compaction to a porosity of 25 percent or less is desirable. A pressure of from 1,000 to 50,000 p. s. i. may be applied and a pressure of about 4,000 p. s. i. is preferred. While maintaining the load on the press, the vacuum pump 4 is started to remove air from the interstitial voids. When substantially all air is removed, the pump 5 is started and injects the liquid bonding agent from tank 6, the injection pressure being read on gauge 7. If the bonding agent requires, the tank 6, pump 5 and connecting lines may be maintained hot to keep the bonding material molten. An injection pressure of about 3,500 p. s. i. is preferred, but should in any event be less than the pressure which plunger 3 exerts on the ion-exchange mass 1. When injection is complete as determined by appearance of the liquid bonding agent at the outlet pipe 8, the injection is stopped, and the bonding material allowed to set by cooling or otherwise. During this entire time the load on plunger 3 is maintained. After setting, the pressure may be released and the solidified membrane may be removed from the press. The solidified membrane is a concatenated array of containing ion-exchange particles embedded in a matrix of solidified plastic.

Fig. 1 shows, for clarity of illustration, the vacuum pump 4 and the injection pump 7 connected to the mass of ion-exchange particles through separate conduits, but it is apparent that only a single conduit may be employed, the ion-exchange mass being first evacuated and then injected with liquid plastic through the same conduit. It is also to be understood that the evacuation or the injection may be effected at any boundary of the ion-exchange mass, as for example through the piston 3 itself or through the bottom of the press 2 by appropriate arrangement of conduits. Other expedients which are well known in the injection-molding art may be employed, e. g. for obtaining proper heat transfer, for keeping the ion-exchange particles from entering the connecting conduits, and for injecting the proper amount of plastic.

Another manner in which the method of this invention for making a substantially completely concatenated ion-exchange membrane may be carried out is as follows. A quantity of air-dried ion-exchange powder of less than 325 mesh U. S. Standard Screen Series is placed in the press and subjected to a high pressure. By using finely-divided material the particles are effectively briquetted. The briquette of ion-exchange material may then be removed from the press and may be gently handled without change in shape of the compacted material. A pressure of 5,000 p. s. i. has been found to be a satisfactory briquetting pressure. This pressure reduces the porosity of the 325 mesh ion-exchange powder in the briquette to about 20 percent. It is apparent that in such a briquette the particles of ion-exchange material are completely concatenated, each particle being in contact with a great many of its neighboring particles. In order to constrain the particles of ion-exchange material and hold them in contact, the briquette is placed in a vessel which is then evacuated. When under vacuum a liquid plastic is run over the briquette so as to submerge it. The plastic may contain the usual catalyst and accelerator to make possible setting of the plastic at room temperature. The immersed briquette may be removed from vacuum or may be left in the evacuated vessel until the plastic is set. Excellent results have been obtained by using a comercially-available polymerizable unsaturated-hydrocarbon-containing alkyd resin, together with 0.5 percent by weight of methyl ethyl ketone peroxide as catalyst, and .05 percent by weight of cobalt naphthenate as accelerator. The amount of accelerator used controls the setting time of the plastic and the above-mentioned percentage is sufficient to permit complete setting overnight without undue shrinkage occurring. After the plastic has set firmly the outer film of excess plastic may be removed by abrasion or other mechanical means and the membrane is then ready for use.

Resistivity data have been obtained for a briquette-type membrane made as described above. The resistivity varies as a function of the concentration of the NaCl solution in which the membrane was equilibrated before its resistivity was measured. By way of example, the following values were measured on a membrane made by briquetting 325 mesh ion-exchange powder to a porosity of 25 percent and vacuum impregnating with liquid plastic.

Concentration of NaCl solution:                Resistivity
    4.0 Normal _____ohm-cms__ 314
    2.0 Normal _____ohm-cms__ 409
    1.0 Normal _____ohm-cms__ 451
    0.5 Normal _____ohm-cms__ 538
    0.1 Normal _____ohms-cms__ 749
    0.05 Normal _____ohm-cms__ 797
    0.01 Normal _____ohm-cms__ 908

The electrochemical performance data for this type of membrane is illustrated by the following measured values in NaCl solutions:

Solutions:                     Observed EMF.
    0.01 N vs. 0.05 N _____mv__ 36
    0.01 N vs. 0.10 N _____mv__ 55
    0.01 N vs. 0.50 N _____mv__ 92
    0.01 N vs. 1.0 N _____mv__ 106
    0.01 N vs. 2.0 N _____mv__ 122
    0.01 N vs. 4.0 N _____mv__ 136

The last-named way of making a fully-concatenated ion-exchange membrane has the advantage that the ion-exchange material is never subjected to heat above room temperature. Therefore, it is impossible to damage the ion-exchange material and the resulting membrane has a high electrochemical efficiency. The pressure used to produce the briquette of ion-exchange material controls both membrane strength and resistivity. The higher the molding pressure the lower the porosity of the briquette and the lower will be the resistivity of the final membrane. Offsetting this is the fact that high molding pressure with the attending low initial porosity produces a membrane of poor mechanical strength because of the smaller amount of binding material per unit volume. A porosity of about 20 percent has been found to give reasonable mechanical strength together with low electrical resistivity. The molding or briquetting pressure may be adjusted to effect a desired balance between these factors to take care of special requirements in making membranes which are required for particular applications.

An alternative and relatively simple method of preparing a membrane by the process of this invention is illustrated in Figs. 2, 3, and 4. A button 10 of thermoplastic material, e. g. polystyrene, is placed between the plunger 13 of the press and the powdered ion-exchange material 11 contained in the receptacle 12 of the press. Since the polystyrene is solid at ordinary temperatures, the application of pressure to the plunger 13 serves to compact the ion-exchange material 11. A pressure of 10,000 p. s. i. may be applied. When compacted, the entire material is heated to 200° C. with the pressure maintained. It is found that the polystyrene will melt and flow down into the voids between the ion-exchange particles as illustrated in Fig. 3. The press is now allowed to cool and the resulting mass illustrated in Fig. 4 is removed. The excess polystyrene in that portion of Fig. 4 above the line 15—15 may be cut off, leaving only the undisturbed ion-exchange material in a matrix of polystyrene. While this method of performing the process of this invention is not as good as that of injecting the molten plastic as shown in Fig. 1 it nevertheless has been found to produce membranes of comparatively low electrical resistance.

A better way of carrying out the above-described method consists in first putting into the press 22 a layer of porous silica sand as shown at 16 of Fig. 5. The upper surface of the sand is leveled by tamping and the sand may be compacted by a preliminary application of pressure by the piston 23 on the sand alone. A mixture of ion exchanger 17 and plastic 18 is then put on top of the sand as indicated in Fig. 5. The mixture 17—18 may comprise particles of a sulfonated polystyrene type of ion exchanger mixed with powdered plastic, as for instance powdered methyl methacrylate. The sulfonated polystyrene type of ion exchanger may be in the form of spheres ranging from 12 to 30 mesh, or may comprise particles having a range of sizes such by way of example as the following particle-size distribution:

Percent
12–20 mesh_____ 50.0
20–30 mesh_____ 35.0
30–40 mesh_____ 12.0
40–50 mesh_____ 2.5
Through 50 mesh_____ 0.5

It has been found preferable to use somewhat coarser particles than those used in the above-described briquetting process. The particular size of the methyl methacrylate is not critical but something less than 200 mesh is convenient. An excess of methyl methacrylate powder is purposely used, that is a greater amount of methyl methacrylate should be present in the mixture than that required to merely fill the voids between the particles 17 of ion-exchange material. When the mixture of ion-exchange material and plastic has been placed on top of the sand, pressure is applied by piston 23 and the mold heated in order to liquidize the plastic. The applied pressure serves to press together and compact the ion-exchange particles 17 as shown in Fig. 6. I have found a molding temperature of 150° C. and a pressure of 2,000 p. s. i. to be satisfactory when using methyl methacrylate plastic. Pressures greater than about 2,500 p. s. i. result in impaired mechanical strength of the resulting membrane, while pressures less than about 1,000 p. s. i. result in membranes of greater than minimum electrical resistivity. During the molding process excess plastic 18 is squeezed out of the layer 17 and the non-fluid ion-exchange particles 17 are pressed together and concatenated by the piston of the press. The excess plastic which is squeezed out from between the particles of ion-exchange material finds its way into the pore space of the sand layer 16. Because of the supporting effect of the sand layer 16 a pressure is developed tending to push the particles of ion-exchange material 17 into firm contact with each other. Furthermore, the pressure may be readily adjusted to control the plastic content of the membrane being made. After the molding process and when the material has cooled, it is removed from the press and the layer 16 may be removed from the upper layer, leaving the ion-exchange material in the form of a compacted substantially completely concatenated network of ion-exchange particles 17 embedded in a matrix of plastic. The sand portion 16 may than be cut away along the line 19—19 shown in Fig. 7.

By way of example, a one-inch diameter mold was filled to a depth of one-half inch with silica beach sand of size 100 mesh and porosity of about 40 percent, and the surface of the sand leveled by tamping. A mixture of sulfonated polystyrene type of cationic-exchange material of 12–30 mesh was mixed with an excess of methyl methacrylate molding powder, the latter being finer than 200 mesh, and placed in the mold on top of the sand. The assembly was molded at 2,000 p. s. i. and at a temperature of 150° C. After cooling the assembly was removed from the mold and the sand portion cut away. The resulting cationic-exchange membrane was found to have the following properties: resistivity—circa 600 ohm-centimeters with ion-exchange material in the sodium form; electrochemical performance—circa 134 mv. when separating a 4.0 N. NaCl solution from a 0.01 N. NaCl solution.

The foregoing technique has also been used in an exactly similar manner for the manufacture of electrolytically-conducting ion-exchange membranes having anion-exchange properties using, of course, an appropriate anion-exchange material. By way of example, the above process was used to make an anion-exchange membrane in an exactly similar fashion. The resulting membrane had a resistivity circa 500 ohm-centimeters with ion-exchange material in the chloride form, and an electrochemical performance of circa 125 mv. when separating a 4.0 N. NaCl solution from a 0.01 N. NaCl solution.

It is apparent that the sand in the above-described process may be replaced by any means which is reasonably inert, refractory, and porous or permeable so that the excess molten plastic may pass through or into it. The only requirement of the material 16 of Fig. 5 is that the porosity and permeability should not be seriously altered by the application of pressure. Whatever permeable material 16 is employed becomes bonded to the bottom of the membrane 17, but is easily removed after molding and before the membrane 17 is used.

Still another way in which the above-described process may be carried out is to suspend the particles of ion-exchange material in the liquid plastic to form a slurry. Thus, finely-ground ion exchanger may be mixed with liquid polymerizable resin to form a thick paste. Intimate contact of the ion-exchange particles and the liquid may be assured by agitating the mixture, after which entrained air is removed. This paste or slurry is placed in a filter press and pressure applied to squeeze out the excess liquid. The pressure at the same time effects substantially complete concatenation of the particles of ion-exchange material. The maximum applied pressure may be regulated to allow a desired percentage of interstitial voids between particles of ion exchanger, which voids will be completely filled with the insulating liquid. The press cake so obtained may be removed from the press and will retain its form under gentle handling. Subsequently the cake may be baked, or the bonding material may simply be permitted to polymerize spontaneously with time at room temperature to set firm. Alternatively the polymerization may take place in the press and the cake removed afterward. This technique has the advantage of assuring complete filling of the interstitial voids between ion-exchange particles with plastic, and avoids any possibility of some voids being left unfilled or only partially filled. When liquid bonding material is flowed or even forced under pressure into the voids, there may be some part of the void close to the grain contacts which is not filled due to the surface tension of the liquid, thus leaving part of the void unfilled. The effect of a partially-filled void is to permit the adjacent grains to imbibe more water than other grains, thus disturbing the optimum constraining condition of the plastic matrix in this regard and reducing the electrochemical efficiency of the membrane, and this is avoided by the above-described technique.

In order to compute the amount of inert insulating plastic which is required to fill the voids between the concatenated ion-exchange particles, it is convenient to know the relationship between the percent porosity and the compaction pressure for the form of ion-exchange material which is to be used. Such a curve may be made by separate tests on the powdered ion-exchange material in well-known manner. The curve 20 shown in Fig. 8 is for 35–40 mesh spherical particles of a commercial ion-exchange material, and curve 21 is for powder obtained by grinding the air-dried ion-exchange material in a ball mill and then sieving through a 325 mesh U. S. Standard Screen. The ordinate or percent porosity is a logarithmic scale so that the resulting curves are linear or nearly so. Such curves may be used to compute the pore space which must be filled with inert plastic when any given pressure is applied to the particles of ion-exchange material in the process herein described. Similar curves may be prepared for any type of ion-exchange material which it is desired to employ in the process herein described.

The foregoing specification describes a method of achieving the objects of this invention, namely to obtain an electrolytically-conducting ion-exchange membrane composed of discrete particles of ion-exchange material, which particles are each in intimate contact with a maximal number of neighboring particles, and with the remaining interstitial voids filled with a chemically-inert electrically-insulating binder. Other variations of the method of this invention and equivalent ways of performing the various steps will be evident to those skilled in the art.

What I claim as my invention is:

1. A process of preparing an electrolytically-conducting membrane having ion-exchange properties which comprises compacting a finely-divided ion-exchange material to reduce the interstitial voids between particles to less than 25 percent of the total volume, and, while maintaining the particles in compacted form, evacuating the interstitial voids between said compacted particles, filling the interstitial voids with an electrically-insulating polymerizable resinous liquid, and effecting polymerization of said liquid.

2. A process of preparing an electrolytically-conducting membrane having ion-exchange properties which comprises compacting a finely-divided ion-exchange material by the application of pressure, and, while maintaining said ion-exchange material in compacted form, evacuating the interstitial voids between the compacted ion-exchange particles, filling the interstitial voids with an electrically-insulating liquid which is polymerizable at room temperature, and effecting polymerization of the liquid.

3. A process of preparing an electrolytically-conducting membrane having ion-exchange properties which comprises compacting a quantity of a finely divided ion-exchange agent by application of pressure, and, while maintaining the said agent in compacted state, injecting into the interstitial voids a flowable chemically-inert electrically-insulating bonding material at a pressure not exceeding the compaction pressure and solidifying the said bonding material.

4. A process of preparing an electrolytically-conducting membrane having ion-exchange properties which comprises compacting a quantity of ion-exchange resin by application of pressure, and, while maintaining the compaction pressure, injecting into the interstitial voids a liquid electrically insulating synthetic polymerizable bonding resin at a pressure not exceeding the compaction pressure and polymerizing the injected resin.

5. A process of preparing an electrolytically-conducting membrane having ion-exchange properties which comprises compacting by the application of pressure a quantity of a finely divided ion-exchange agent to contain less than 25 percent interstitial voids, and, while maintaining the said agent in compacted state, injecting into the interstitial voids a liquid electrically-insulating synthetic polymerizable bonding resin at a pressure not exceeding the compaction pressure and polymerizing the injected resin.

6. The process of claim 5 in which the said resin is polystyrene and the temperature at which the resin is injected into the interstitial voids is above 200° C.

References Cited in the file of this patent

UNITED STATES PATENTS

| Number | Name | Date |
|---|---|---|
| 1,899,064 | Storey | Feb. 28, 1933 |
| 1,916,495 | Shaw | July 4, 1933 |
| 2,181,695 | Given | Nov. 28, 1939 |
| 2,345,305 | Thornton | Mar. 28, 1944 |
| 2,368,306 | Kiefer et al. | Jan. 20, 1945 |
| 2,457,440 | Booth | Dec. 28, 1948 |
| 2,614,976 | Patnode et al. | Oct. 21, 1952 |

OTHER REFERENCES

Wyllie et al.: "Journal of Physical and Colloid Chemistry," vol. 54 (February 1950), pp. 204–227.